April 26, 1938.  O. L. BEARDSLEY  2,115,002
TRAIL AND DRAWBAR CONNECTION FOR GUN CARRIAGES
Filed Sept. 18, 1936
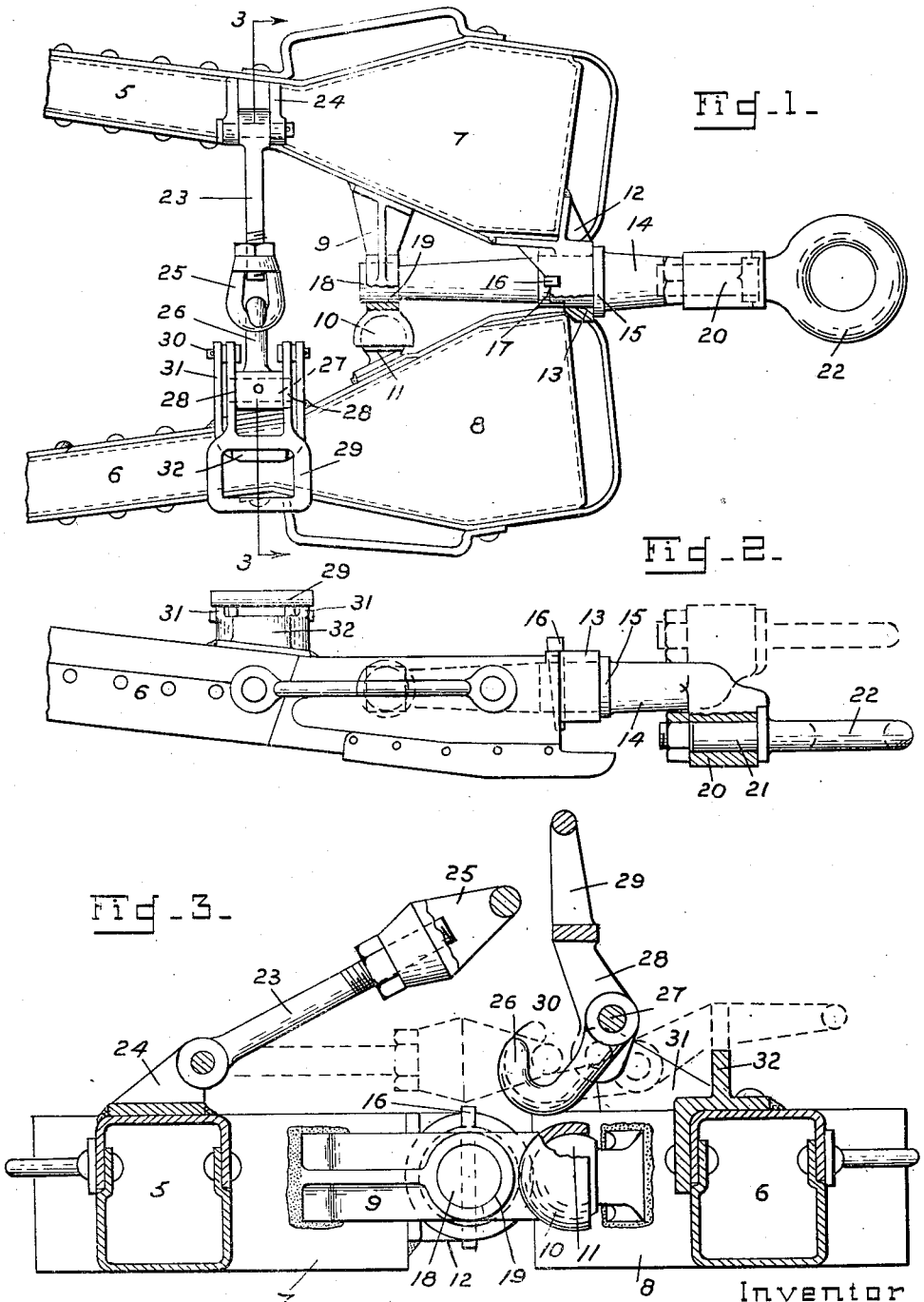
Inventor
Orie L. Beardsley
By W. N. Roach
Attorney Patented Apr. 26, 1938

2,115,002

UNITED STATES PATENT OFFICE 2,115,002

TRAIL AND DRAWBAR CONNECTION FOR GUN CARRIAGES

Orie L. Beardsley, Gary, Ind.

Application September 18, 1936, Serial No. 101,442

3 Claims. (Cl. 89—40)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a trail and drawbar connection for gun carriages.

Gun carriages are drawn at high speeds over all kinds of obstacles and because of this severe usage the trail and drawbar connections are subject to great stresses which frequently produce failure.

The purpose of this invention is to provide a trail connection which may be easily and quickly made and unmade and which will afford positive transmission of draft while permitting relative shifting movement of the trails.

To these and other ends, the invention consists in the construction, arrangement and combination of elements described hereinafter and pointed out in the claims forming a part of this specification.

A practical embodiment of the invention is illustrated in the accompanying drawing, wherein:

Fig. 1 is a plan view showing a pair of trails connected for traveling.

Fig. 2 is a view in side elevation, and

Fig. 3 is a sectional view on the line 3—3 of Fig. 1.

Referring to the drawing by characters of reference there are shown the rear portions of a pair of similar trail members 5 and 6 which serve in the usual capacity for emplacing a gun carriage for firing or connecting it to a limber for traveling. The trails are normally separated when serving as emplacing members and they are brought together as shown in the drawing when they are to be connected to the limber. In the present illustration the trails 5 and 6 are formed with widened rear ends or floats respectively 7 and 8 which are adapted to rest on the ground and be anchored thereto by the customary spades, not shown.

A laterally extending arm 9 fixed on the interior side of the float 7 intermediate its length has its free end formed with a hemi-spherical socket 10 for receiving a spherical lug or ball 11 fixed on the inner side of the float 8. This connection limits movement of the trails towards one another.

A laterally extending bracket 12 is fixed on the inner side of the float 7 in rear of the arm 9 and includes a bearing 13 for receiving a drawbar 14. A collar 15 on the drawbar is held against the rear face of the bearing when a tapered pin 16 is inserted through the drawbar and in aligned recesses in the front face of the bearing, only the upper recess 17 being shown in the drawing. By virtue of this arrangement the drawbar is held against both longitudinal and rotational displacement. The inner or front end 18 of the drawbar is fitted in an opening 19 in the arm 9 while the rear end is formed into an offset bearing 20 for receiving the stem 21 of a lunette 22. The offset bearing provides for vertical adjustment of the lunette upon rotation of the drawbar.

A separable fastener for holding the trails against separation is provided forwardly of the arm 9 and comprises a bar 23 pivoted on a bracket 24 on the trail 5 and having an adjustably positioned loop 25 on its free end for receiving a hook 26 which carries a pivot pin 27 journaled at some distance from the pivoted end of the spaced sides 28—28 of a lever 29. Each of the sides 28 is mounted at one end on a pivot pin 30 in a side rail 31 of a bracket 32 fixed on the trail 6. As clearly shown in Fig. 3 the coupling is made or unmade with the lever in a substantially vertical position and when the lever is moved to a horizontal position the pivot pin 27 is displaced and the hook 26 firmly locked to the loop 25.

When the trails are coupled for traveling the pull of the drawbar 14 is transmitted through the bearing 13 to the trail 5 and then through the arm 9 to the trail 6. While the connection afforded by the arm 9 is positive and rigid the ball and socket construction as well as the flexible coupling between the loop 25 and hook 26 will permit slight relative movement between the trails 5 and 6.

I claim.

1. In a gun carriage, a pair of trails, a laterally extending arm fixed on the inner side of one trail and having a socket on its free end, a ball member fixed on the other trail and positioned to enter the socket of the arm when the trails are brought together, a bracket fixed on the rear end of the trail that carries the arm, a drawbar fixed in the bracket and having one end engaging the arm, and means for holding the trails against separation.

2. In a gun carriage, a pair of trails, a laterally extending arm fixed on the inner side of one trail and having a socket in its free end, a ball member fixed on the other trail and positioned to enter the socket of the arm when the trails are brought together, and means for holding the trails against separation while permitting universal motion of the ball in said socket.

3. In a gun carriage, a pair of trails, means on one trail for the application of draft thereto, universally coupled members between the trails for transmitting draft from one trail to the other, and means for holding the trails against separation while permitting universal movement.

ORIE L. BEARDSLEY.